(12) United States Patent
Kubisch et al.

(10) Patent No.: US 10,487,745 B2
(45) Date of Patent: Nov. 26, 2019

(54) METHOD FOR MANUFACTURING OF AT LEAST ONE PART OF AN ENGINE COMPONENT BY MEANS OF A BLANK OF INTUMESCENT MATERIAL

(71) Applicant: Rolls-Royce Deutschland Ltd & Co KG, Blankenfelde-Mahlow (DE)

(72) Inventors: Thomas Kubisch, Koenigs-Wusterhausen (DE); Oliver Kaak, Berlin (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 0 days.

(21) Appl. No.: 15/697,926

(22) Filed: Sep. 7, 2017

(65) Prior Publication Data

US 2018/0073436 A1  Mar. 15, 2018

(30) Foreign Application Priority Data

Sep. 9, 2016 (DE) .......................... 10 2016 217 227

(51) Int. Cl.
*F02C 7/25* (2006.01)
*B64D 29/00* (2006.01)
(Continued)

(52) U.S. Cl.
CPC .............. *F02C 7/25* (2013.01); *B29C 70/02* (2013.01); *B29C 70/88* (2013.01); *B32B 5/02* (2013.01);
(Continued)

(58) Field of Classification Search
CPC .............. B29C 70/02; B29K 2105/048; B29K 2995/0016; B32B 9/00; B32B 5/02;
(Continued)

(56) References Cited

U.S. PATENT DOCUMENTS 3,816,226 A  6/1974  Finelli
4,801,496 A  1/1989  Buchacher
(Continued)

FOREIGN PATENT DOCUMENTS

AU  2006235991 A1  5/2007
EP  669967 B1  6/1997
(Continued)

OTHER PUBLICATIONS

German Search Report dated Apr. 13, 2017 for counterpart German Application No. DE 10 2016 217 227.1.
(Continued)

*Primary Examiner* — Camie S Thompson
(74) *Attorney, Agent, or Firm* — Shuttleworth & Ingersoll, PLC; Timothy J. Klima

(57) ABSTRACT

A method for manufacturing at least one part of an engine component by means of a blank from an intumescent material, which contains at least one fibrous matrix of organic and/or inorganic fibers and an intumescent substance, is provided. The blank is created from the intumescent material with a three-dimensional structure that is already adjusted with respect to its contours to the contours of the part of the engine component to be manufactured and the blank comprising the three-dimensional structure is impregnated through a hardening resin, and is connected, prior to or after the impregnation, to at least one support material that is also already adjusted to the contours of the part to be manufactured and at least partially forms the engine component together with the blank connected thereto.

14 Claims, 14 Drawing Sheets

(51) Int. Cl.

| | | |
|---|---|---|
| *C09K 21/00* | (2006.01) | |
| *F01D 25/14* | (2006.01) | |
| *B32B 5/02* | (2006.01) | |
| *B32B 9/00* | (2006.01) | |
| *B29C 70/88* | (2006.01) | |
| *B29C 70/02* | (2006.01) | |
| *F02K 1/82* | (2006.01) | |
| *B29K 105/04* | (2006.01) | |
| *H01B 7/295* | (2006.01) | |

(52) U.S. Cl.
CPC ............... *B32B 9/00* (2013.01); *B64D 29/00* (2013.01); *C09K 21/00* (2013.01); *F01D 25/14* (2013.01); *F02K 1/822* (2013.01); *B29K 2105/048* (2013.01); *B29K 2995/0016* (2013.01); *B32B 2305/22* (2013.01); *B32B 2307/30* (2013.01); *B32B 2307/3065* (2013.01); *B32B 2398/00* (2013.01); *B32B 2605/18* (2013.01); *F05D 2300/603* (2013.01); *H01B 7/295* (2013.01)

(58) Field of Classification Search
CPC ........ B32B 2307/30; B32B 2307/3065; B32B 2305/22; B32B 2307/103; B32B 2307/304; B32B 15/08; B32B 27/18; C09K 21/00; F01D 25/24; F01D 25/14; F02C 7/25; F02K 1/822; F05D 2300/603; H01B 7/295; Y10S 428/92; Y10S 428/923; B64D 29/00
USPC ...................................... 428/920, 923, 295.1
See application file for complete search history.

(56) References Cited

U.S. PATENT DOCUMENTS

| | | | |
|---|---|---|---|
| 5,281,388 A | | 1/1994 | Palmer et al. |
| 5,384,188 A | * | 1/1995 | Lebold .................. C04B 26/04 442/414 |
| 6,855,393 B1 | | 2/2005 | Ayres |
| 8,444,790 B2 | | 5/2013 | Tong |
| 2003/0097752 A1 | * | 5/2003 | Shirk ................. B01D 53/9454 29/890 |
| 2005/0136761 A1 | | 6/2005 | Murakami et al. |
| 2009/0255619 A1 | | 10/2009 | Tong |
| 2011/0147358 A1 | | 6/2011 | Kober et al. |
| 2014/0140809 A1 | | 5/2014 | Emery et al. |
| 2015/0174866 A1 | | 6/2015 | Luinge et al. |
| 2018/0044489 A1 | | 2/2018 | Takehara et al. |

FOREIGN PATENT DOCUMENTS

| | | |
|---|---|---|
| EP | 1106744 A1 | 6/2001 |
| EP | 949313 B1 | 3/2004 |
| EP | 2946925 A1 | 11/2015 |
| EP | 2788183 B1 | 3/2016 |
| GB | 2480591 B | 11/2013 |

OTHER PUBLICATIONS

Parlevliet, P.P., Investigations Into Lightweight Solutions for Improvement of Fire Properties of Epoxy Composites, ECCM16—16h European Conference on Composite Materials, Seville, Spain, Jun. 22-26, 2014.
Regina Fireshield, FireShield Autoclave, FireShield Manufacturing Instructions: Autoclave (Prepreg) Processing, Rev. A, Jan. 15, 2008.
TFP Global, Tecnofire E-84, Successful in E84 Testing, What is E84 Testing & Why is it Important?, 2000.
European Search Report dated Feb. 16, 2018 for counterpart European Patent Application No. EP 17187733.5.
Notice of Opposition dated Apr. 4, 2019 filed in related European Application No. EP 17187735.0.
Technical Fibre Products LTD, "Tecnofire®—Resin Infused" Nov. 17, 2014, http://www.tfpglobal.com/products/tecnofire®/tecnofire®-resin-infused/.
European Search Report dated Nov. 7, 2017 for related European Application No. 17187735.0.
German Search Report dated Sep. 9, 2017 for related German Application No. 10 2016 217 234.4.

* cited by examiner

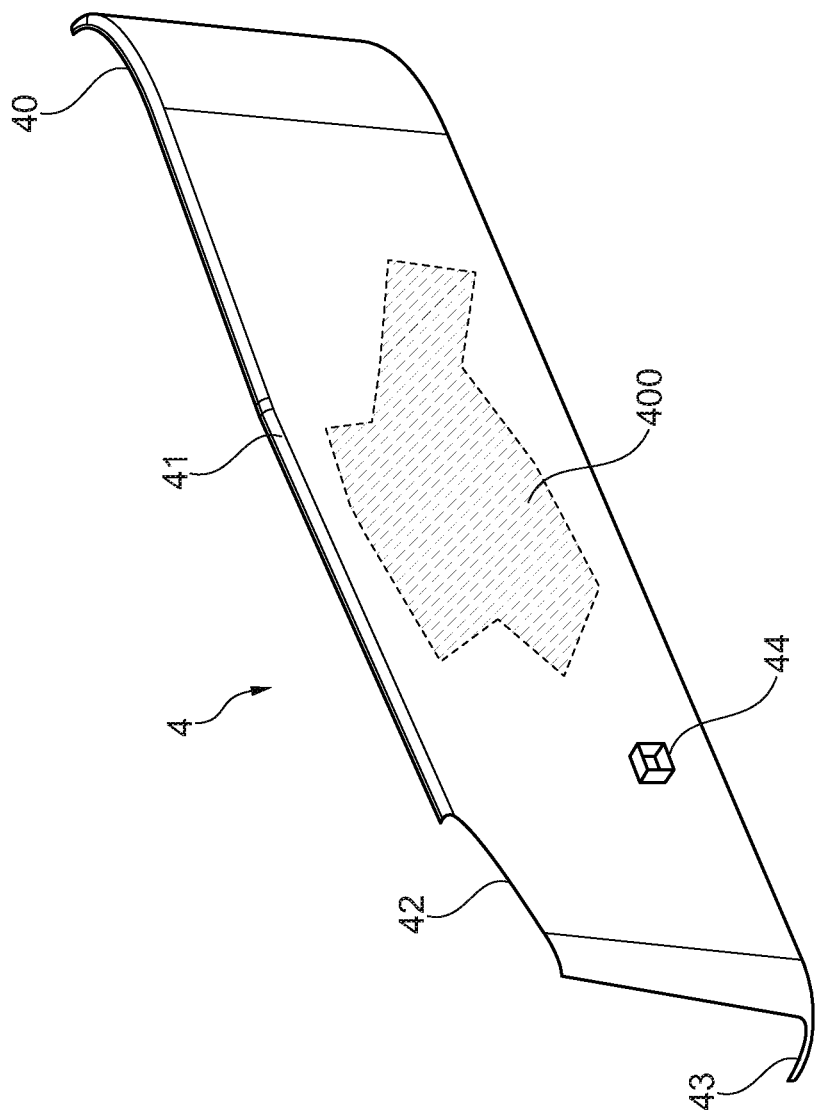

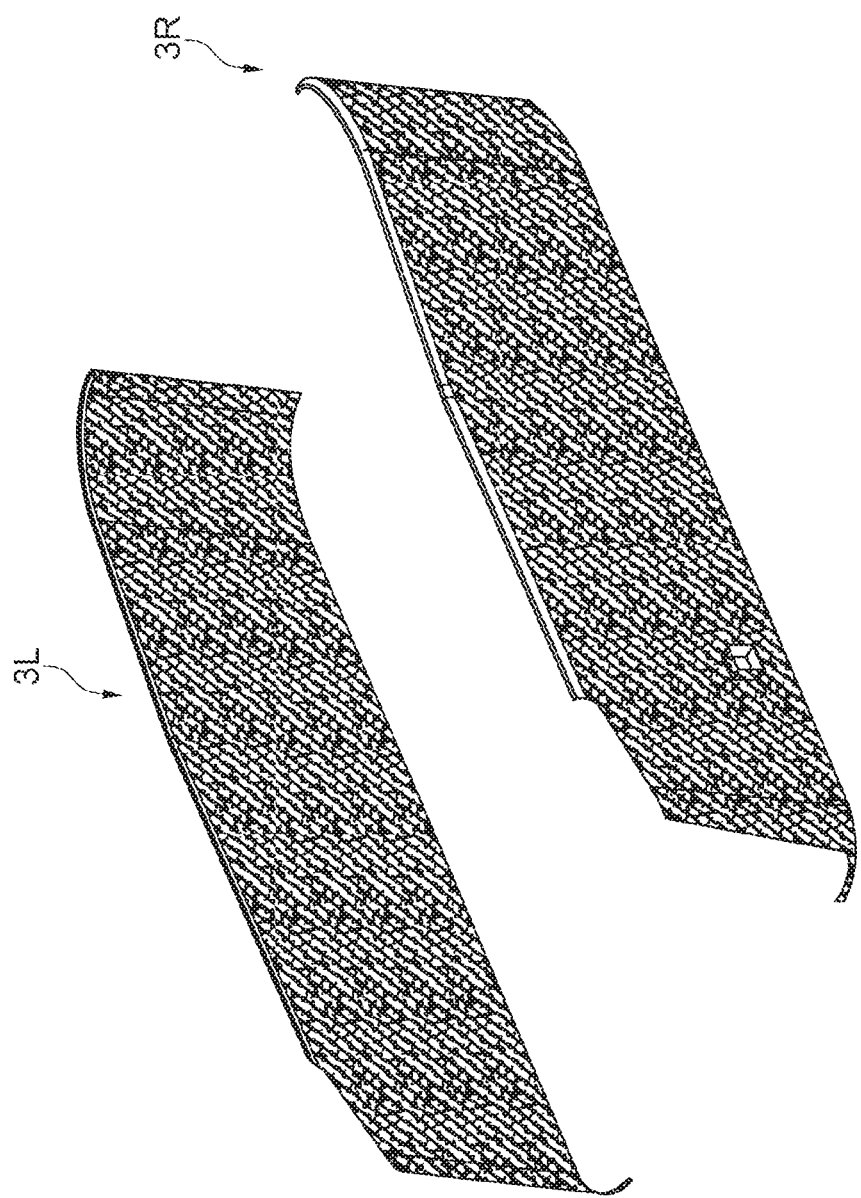

METHOD FOR MANUFACTURING OF AT LEAST ONE PART OF AN ENGINE COMPONENT BY MEANS OF A BLANK OF INTUMESCENT MATERIAL

REFERENCE TO RELATED APPLICATION

This application claims priority to German Patent Application No. 10 2016 217 227.1 filed on Sep. 9, 2016, the entirety of which is incorporated by reference herein.

BACKGROUND

The invention relates to a method for manufacturing at least one part of an engine component.

In the field of engines, it is common to use composite components (composite technologies) for manufacturing of engine components. Here, fiber-reinforced composite materials are used in different configurations and for different engine components in order to obtain the desired material characteristics through the combination of different materials. Here, a composite component (composite laminate) from which an engine component is made consists of at least two layers of different materials that are connected to each other in a firmly bonded, cured and/or form-fit manner. What is further known in engine components is to provide these multi-layer composite component with at least one fire-retardant or fireproof layer to obtain a predefined fire resistance or fire retardance. Then, it is for example possible to define a sealed off area with the corresponding engine component in order to avoid or at least keep within limits a fire spreading inside the engine.

In particular in the field of construction, it is further known from fire prevention to use intumescent and often porous construction materials that swell or foam under the effect of heat, thus considerably increasing in volume in the event of fire. For example, the intumescent material serves for forming an incinerating insulation layer that inhibits the oxygen supply, and therefore the spreading of a flame. Further, a sealing of a critical area can also be achieved through the expanding intumescent material, so that a flame cannot spread further inside it. Composite components with at least one layer of an intumescent porous material are known from AU 2006-235991 A1 or EP 0 949 313 B1, for example.

So far, the use of intumescent material in the engine area is not common. Consequently, at this point in time there are at best rudimentary considerations of manufacturing engine components with at least one layer containing intumescent material in a manner that is as compact, easy and simple as possible.

SUMMARY

The invention is thus based on the objective to provide a manufacturing method by means of which an engine component with an intumescent material can be manufactured in a simple manner.

This objective is achieved through a manufacturing method with features as described herein.

In a manufacturing method according to the invention, at least one part of an engine component is manufactured by means of a blank made of an intumescent material that contains at least one fibrous matrix of organic and/or inorganic fibers as well as an intumescent substance. Here, it is provided that the blank is made of an intumescent material with a three-dimensional structure that is already adjusted with respect to its contours to the contours of the part of the engine component to be manufactured, and that the blank comprising the three-dimensional structure is impregnated by means of curing resin. Before or after the impregnation, the blank is connected to at least one support material, for example a composite laminate or prepreg, which is also already adjusted to the contours of the part to be manufactured and at least partially forms the engine component together with the blank that is connected therewith.

Thus, the invention is based on the basic idea of manufacturing a blank from the intumescent material already early on, with the contours of the blank corresponding to the part of the engine component to be manufactured. Thus, the blank from the intumescent material already has corresponding recesses, free punches, bent areas, separations, interfaces, indentations and/or projections that have to be present at the engine component to be manufactured, for example for connecting and/or guiding further components of the engine. This in particular includes the integration of mechanical and/or electrical connections into the blank Only after that, the blank which is usually made of a flexible intumescent material, is connected to the usually structuring support material of the engine component. Generally, it can be provided that the blank is only mounted at the support material and fixated at the same by means of bonding, for example. Alternatively, it is provided in one variant that the blank together with the at least one support material forms the composite component (as a composite laminate), in which the at least one support material and the blank are connected to each other in a firmly bonded, co-cured and/or form-fit manner by means of the resin that is used for impregnation. In the composite component that is thus created, one layer is then formed with the intumescent material of the blank, and at least one layer is formed from the at least one support material.

The introduced resin or the introduced resin mass is absorbed in particular by the intumescent material, as the intumescent material has a high porosity, and thus the intumescent material is imbued by the resin, so that the intumescent material is sealed after the resin has cured. Then, a sealed layer can be formed at the engine component by means of the intumescent material sealed by the resin, which is resistant against the effects of fluid. The intumescent material can for example have a porosity of more than 70%, in particular in the range of more than 85% or approximately 90%. In the unprocessed state, the intumescent material is for example present as a batt, in particular in a felt-like manner as a mat-like material layer of a fiber fleece material. For example, a material layer of Tecnofire® by Technical Fibre Products Ltd. is used.

In an engine component manufactured according to the invention, in the event of fire or if a temperature exceeds as critical threshold value, the resin degasses from the intumescent material or vaporizes, thus releasing the intumescent material, so that it can swell or foam in order to have a fire-inhibiting or fire-retardant effect. Here, an increase in the volume of the layer with the intumescent material is allowed only by the degassing resin, as the resin does no longer keep the layer in its shape. A temperature-driven increase in volume of the intumescent material occurs simultaneously or subsequently to the degassing of the resin or to the vaporization or combustion of the resin. In this manner, a controlled flame treatment can be achieved, for example through the degassing resin, with the material of the engine component that is imbued with resin burning off similar to a candle before a barrier is subsequently created by the (further) swelling or foaming of the intumescent material, which counteracts a further spreading of the flames. Here, the layer with the intumescent material acts as a heat shield in the event of fire or already if a temperature exceeds a critical threshold value.

The blank itself can for example be made of a batt of intumescent material. In this case, such a batt can be processed for creating the three-dimensional structure. For example, in this way sections of the batt are reshaped, separated and/or removed for this purpose in order to already reproduce the contours of the part of the engine component to be manufactured as true to size as possible.

For creating the three-dimensional structure, alternatively or additionally sections of the batt can also be sewed and/or woven together. When it comes to the usual intumescent material with a fibrous matrix, such as for example Tecnofire® by Technical Fibre Products Ltd., it is generally possible to saw together and/or weave together the fiber material to form complex three-dimensional structures. For example, sections of the batt that are bent in this manner, in particular folded, can be attached to other sections of the batt, and fixated in their bent position in this way.

In a further embodiment variant for creating the three-dimensional structures, the sections of a batt are sawn together and/or woven together with sections of a further intumescent material. This further intumescent material is provided by an additional batt, for example. Consequently, the blank intumescent material is made of multiple (at least two) batts or sections cut out from the same.

In one embodiment variant, the blank is manufactured by means of a molding tool that is adjusted with respect to its contours to the contours of the part of the engine component to be manufactured, with fibers for the fibrous matrix, which are dispersed in a dispersion, attaching thereat. Thus, the used molding tool copies the part of the engine component to be manufactured, preferably in an exact manner, and is configured and provided for the purpose of the intumescent material attaching at it, so that what results after a drying process at the molding tool is the blank of intumescent material having the desired three-dimensional structure and the component contours.

For this purpose, the molding tool can for example have a water-permeable grid structure or screen structure. In this manner, the molding tool can be submerged in the dispersion, or the dispersion can flow through it, wherein in that case the organic and/or inorganic fibers with the intumescent substance attach to the molding tool. At that, the dispersion can be an aqueous suspension containing at least the organic and/or inorganic fibers, the intumescent substance, and a binding agent. This aqueous suspension can for example have a composition as it is described in EP 0 949 313 B1.

The organic fibers contained in the intumescent material of the blank and thus possibly also in an aqueous suspension comprise fibers of polyester, nylon, aramid, acrylic resin, olefin or cellulose, for example. Examples of inorganic fibers are fibers of glass, mineral wool, stone wool, slag wool, asbestos, ceramic, zirconia, aluminum oxide, or other glassy synthetic fibers.

A binding agent that is contained in the intumescent material of the blank and thus possibly also in an aqueous suspension, for example an elastomer binding agent, can for example be an acrylic, butadiene, vinyl or silicone polymer. Here, the intumescent material of the blank can comprise 2 percent by weight to 30 percent by weight of binding agent, for example.

The intumescent substance can for example comprise foamable graphite, vermiculite, or perlite. In principle, the blank made of intumescent material can for example contain 10 percent by weight to 85 percent by weight of an intumescent substance.

In a variant of the manufacturing method, the blank and the support material are stacked on top of each other prior to the impregnation, and a pressure is applied to compress the intumescent material of the blank Through the curing resin, the intumescent material is then held in its compressed shape, structurally solidified, and sealed off against the entry of any fluids or gasses.

Through the compression of at least the material layer of the intumescent material, it is achieved that the material layer of the intumescent material is present in a comparatively thin-layered form in the finished engine component without loosing the effective fire prevention characteristics. In addition, a smaller amount of resin is required for sealing the intumescent material with the resin. In this manner, it is ensured that an outer layer of the composite component contains less resin, since in the finished composite component the intumescent material usually forms an outer layer on the side that is to be fire-protected. This can be advantageous with respect to a required strength and stiffness of the engine component, in particular because in this way only a comparatively thin layer with intumescent material has to be used, and the available installation space can be used for the other, in that case structure-supporting, layer.

In one embodiment variant, the at least one support material is formed by a composite material. For example, what is provided here is a material layer in the form of a prepreg, i.e. a pre-impregnated semi-finished textile fiber matrix product. Alternatively or additionally, a material layer from a different fiber-reinforced material can be provided as the support material.

In one embodiment variant of a method according to the invention, a heating of the blank and of the support material up to at least a minimum temperature is provided for the impregnation with the resin. Here, the heating is realized for example by heating a reception space of the tool that receives the material layers which are stacked on top of each other. This reception space is defined by a cavity or preform in a mold shell or by an autoclave, for example. The heating serves for keeping the introduced resin in a liquid form or for curing the resin if it is a heat-curing resin, for example.

At this point, it should already be mentioned that the introduction of the resin can be realized through a separate resin layer, for example. Such a resin layer is for example provided between the support material and the Blank that is layered thereon. Alternatively, an injection of the resin can for example be performed by way of a resin transfer molding (RTM,) or in a vacuum-assisted manner by way of a VARI or VARTM method (short for "vacuum assisted resin injection" or "vacuum assisted resin transfer molding"). Alternatively or additionally, if a pre-impregnated prepreg is used, the resin contained therein can be liquefied in the course of the manufacture of the composite component by applying pressure and heating, and then can (also) be used for impregnation of the compressed intumescent material of the blank is layered thereon.

In one embodiment variant, heating up to a minimum temperature of approximately 70° C. is provided for the impregnation to achieve that the resin or the resin mass imbues the compressed intumescent material to a sufficient extent. In the further manufacturing process, it can be provided that the temperature is subsequently increased stepwise up to a first maximum temperature of approximately 120° C., and subsequently up to a second maximum temperature of approximately 175° C.

To ensure that the intumescent material is already densified up to a desired thickness before the resin enters the intumescent material, it is provided in one variant that the pressure for compressing at least the material layer of the intumescent and preferably porous material is applied before the minimum temperature of for example 70° C. is reached. For this purpose, the pressure can be applied when a heating appliance is activated for heating up the blank and the support material to the minimum temperature, or before such a heating appliance is activated. The provided (compression) pressure is thus applied at that point in time or shortly after that point in time when the heating appliance is activated and a heating process is thus initiated. Just like with a downstream activation of the heating appliance, it is ensured in this way that in any case the prescribed pressure acts on the material layers already before the minimum temperature has been reached.

In one embodiment variant, the provided (compression) pressure for compressing at least the intumescent material lies in the range of 5 to 8 bar, in particular in the range of 5.5 to 7.5 bar. For example, a pressure of approximately 7 bar is provided.

As previously discussed, the resin provided for impregnation can be provided as a separate material layer in one embodiment variant. Here, the resin is for example provided as a comparatively thin layer between the blank made of intumescent material and a further material layer of a composite material that serves as a support material. During the subsequent heating and compression, the resin enters the intumescent material and the composite material, and connects them. Such a method can for example be realized in an autoclave.

Alternatively or additionally, the support material can be pre-impregnated, and thus the resin that is provided for impregnating the intumescent porous material can at least partially come from the pre-impregnated support material. What may be particularly advantageous in this context is the previously explained variant in which the (compression) pressure for compressing at least the intumescent material is introduced early on, before heating is carried out. By applying the pressure early on, a resin can be provided in a comparatively small amount to conserve the compressed shape of the intumescent material and to seal it, and can be introduced into the intumescent material already early before a liquefaction of the (additional) resin from the pre-impregnated support material occurs as a result of subsequent heating. In this manner, a possibly undesired intermixing of different resins and thus resin systems inside the engine component can be effectively avoided.

For a firmly bonded connection of the blank and the support material, at least one bonding agent layer can be provided in one embodiment variant. This bonding agent layer can contain a—possibly additional—resin that is used at least partially for impregnating the intumescent material.

In an exemplary embodiment, an autoclave is used as a tool by means of which the blank and the support material are connected to each other as a laminate. In one variant, a pressure for compressing at least the intumescent material can be applied by means of the autoclave in a suitable autoclave process. For instance, what can particularly be provided in a manufacturing process is an autoclave cycle in which the pressure provided for the compression of the intumescent material is applied already early on prior to the heating.

For example, the used intumescent material can be chosen in such a manner and the pressure applied thereto can be set to be so high that a layer with the intumescent porous material defined by the original blank does not exceed a thickness of 2.3 mm in the manufactured engine component. In particular, a (layer) thickness lies in the range of 0.4 mm to 1.5 mm, for example. The layer of compressed intumescent material is thus comparatively thin, and is, as it were, locked and "frozen" in its compressed state by the binding by means of the resin. However, due to the intumescent properties of the material, this layer can swell to reach a multiple of its volume so as to form a fire-retardant barrier.

Independently of the respective densification of the intumescent material or the blank prior to a stabilizing and reinforcing impregnation with resin, in one embodiment variant it is provided that the blank has a wall thickness of less than 4.2 mm. In this manner, a comparatively thin-walled layer of intumescent material can be provided at the engine component to be manufactured even without any compression of the intumescent material.

A method according to the invention serves for manufacturing an engine component for a gas turbine engine, for example. Such an engine component can for instance be an engine housing (also referred to as a "nacelle"), a fan housing, a wall of a bypass channel, or a cladding component for housing at least one conduit and/or a component conducting an electronic and/or fluid, and/or an assembly group inside the engine.

BRIEF DESCRIPTION OF THE DRAWINGS

Possible embodiment variants of the solution according to the invention are illustrated by way of example based on the accompanying Figures.

FIG. 4 shows, in a perspective view, two side parts which the cladding of FIG. 3 is comprised of.

FIG. 6A shows, in perspective view, a molding tool formed in a manner corresponding to the side part to be manufactured and having a screen structure for manufacturing the side part for performing an alternative manufacturing variant.

FIG. 6C shows two blank of intumescent material for the two side parts corresponding to FIG. 4, which are respectively manufactured with molding tools that are immersed in a dispersion.

DETAILED DESCRIPTION

Figure 1:
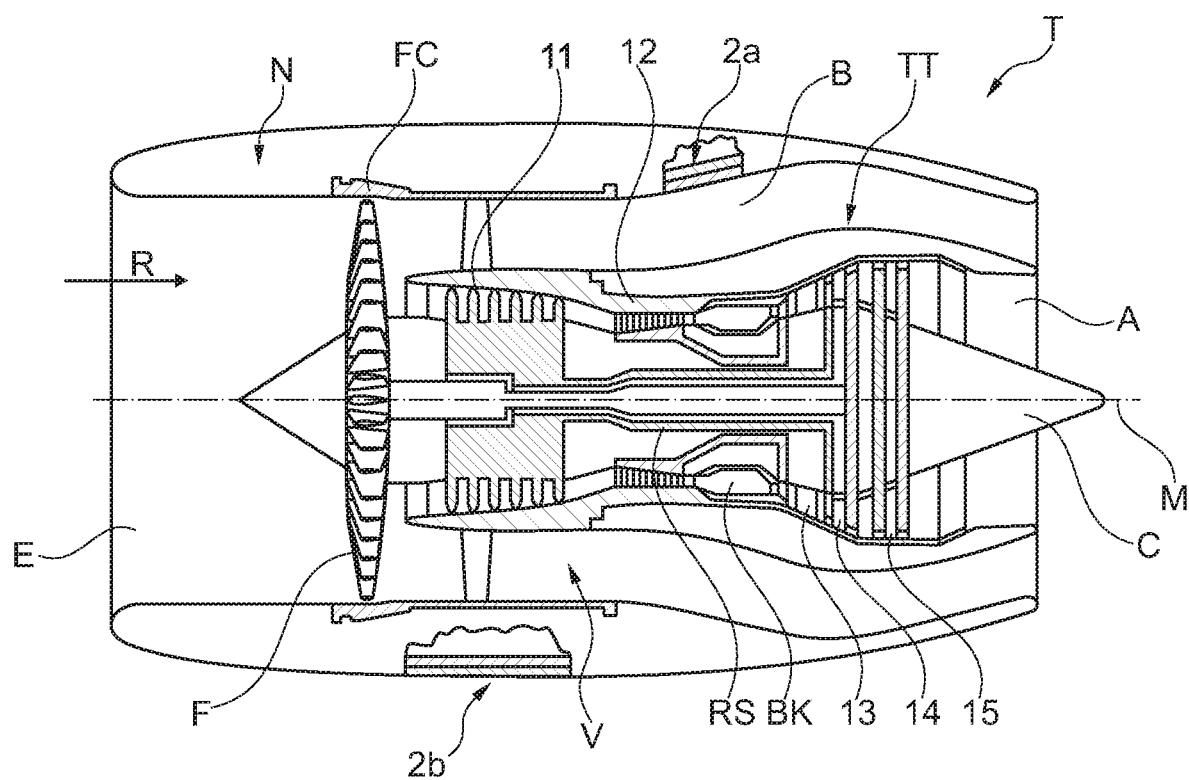
FIG. 1 shows, in a schematic manner and in a cross-sectional view, a gas turbine engine in the form of a turbofan engine, with a composite component (composite laminate) manufactured according to the invention being used at its engine components.

FIG. 1 illustrates, in a schematic manner and in sectional view, a (turbofan) engine T in which the individual engine components are arranged in succession along a rotational axis or central axis M. At an inlet or intake E of the engine T, air is sucked in along an entry direction R by means of a fan F. This fan F, which is arranged in a fan housing FC, is driven via a rotor shaft RS that is set into rotation by a turbine TT of the engine T. Here, the turbine TT connects to a compressor V, which for example has low-pressure compressor 11, and a high-pressure compressor 12, as well as possibly also a medium-pressure compressor. The fan F supplies air to the compressor V, on the one hand, as well as, on the other hand, to the secondary flow channel or bypass channel B in order to create a thrust. Here, the bypass channel B extends about a core engine that comprises the compressor V and the turbine TT as well as a primary flow channel for the air that is supplied to the core engine by the fan F. Towards the outside, the bypass channel B is delimited by an engine housing N which is usually referred to as a nacelle.

The air that is conveyed via the compressor V into the primary flow channel reaches a combustion chamber section BK of the core engine, where the driving power for driving the turbine TT is generated. For this purpose, the turbine TT has a high-pressure turbine 13, a medium-pressure turbine 14, and a low-pressure turbine 15. Here, the turbine TT drives the rotor shaft RS and thus the fan F by means of the energy released during combustion in order to create the required thrust by means of the air that is conveyed into the bypass channel B. The air from the bypass channel B as well as the exhausts from the primary flow channel of the core engine flow out via an outlet A at the end of the engine T. Here, the outlet A usually has a thrust nozzle with a centrally arranged outlet cone C.

Based on FIG. 1 it is illustrated by way of example how the wall delimiting the bypass channel B and/or an outer shell surface of the engine housing N is constructed by means of a multi-layer composite component 2a or 2b in the area of the engine housing N. At that, a wall that delimits the bypass channel B can be provided with a fire-retardant or fireproof layer for avoiding the spreading of flames should a fire occur inside the engine T. The same applies to a casing of the core engine that is located further radially inwards. Here, too, particular parts of the housing are manufactured from a composite component and thus from a composite material, wherein such a composite component usually has at least one layer made of a fireproof or at least fire-retardant material.

Figure 2:
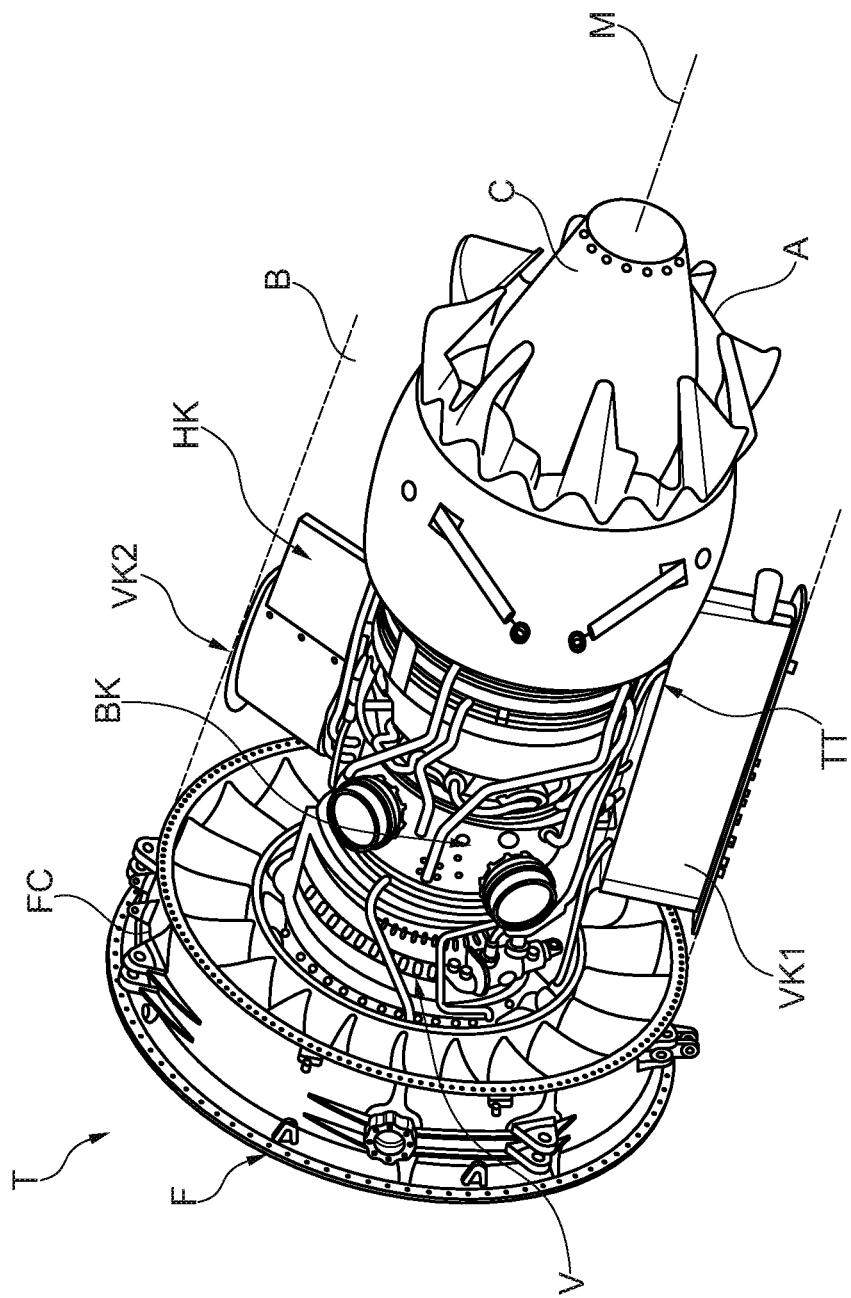
FIG. 2 shows a more detailed rendering of the engine of FIG. 1 in perspective view, without the illustration of an engine housing.

Based on FIG. 2, in which the engine T of FIG. 1 is shown in perspective rendering in a more detailed manner and without the engine housing N, further engine components that can be manufactured from a composite component with at least one fireproof or fire-retardant layer are illustrated by way of example. Here, it may for example be referred to the fan housing FC of the fan F, as well as to claddings VK1 and VK2 that are located inside the bypass channel B. For instance, conduits and/or electronic components can be housed in an aerodynamic manner through the claddings VK1 and VK2. For example, for this purpose a cladding component VK2 forms a trailing edge HK that is tapered in the flow direction of the fluid that is flowing inside the bypass channel B during operation of the engine. The cladding components VK1 and VK2 are usually referred to as "fairings" or "splitter fairing".

Alternatively or additionally to the above-mentioned engine components, it is also possible to manufacture claddings or housings accommodated inside a hollow space in the engine housing N from a composite component that is provided with a fireproof or fire-retardant material for the purpose of fire prevention.

In principle, it is desirable to design all composite component in the engine area with thin walls and above all so as to have a low weight, of course without having to forego effective fire prevention. In this context, the solution according to the invention proposes to integrate an intumescent material into a composite component of one or multiple engine components in order to thus [provide] an effective protection from the spread of flames and/or to prevent any damage to the structural components caused by heat in the event of fire, or already in the event that a temperature exceeds a critical threshold value in an area of the engine T. Here, the advantage of an intumescent material used for this purpose so as to form at least one layer of a multi-layer engine component is that the intumescent material can be provided with a comparatively thin (wall or layer) thickness, and only shows the desired reaction in the event of fire or at least a temperature exceeding a critical threshold value, as it swells to a multiple of its original volume, thus forming an ash layer and/or sealing off certain areas.

So far, the use of intumescent material is not common in the field of engines. Instead, what is used most often in buildings at this point are intumescent batts, for instance. Thus, with the solution according to the invention, the use of intumescent materials in the field of engines is to be simplified. At that, the embodiment variants of a manufacturing method according to the invention that will be explained in the following can also be used in other engine components that are to be provided with a fire prevention layer of intumescent material. Therefore, the cladding VK1 and its manufacture are illustrated more closely merely by way of example.

Figure 3:
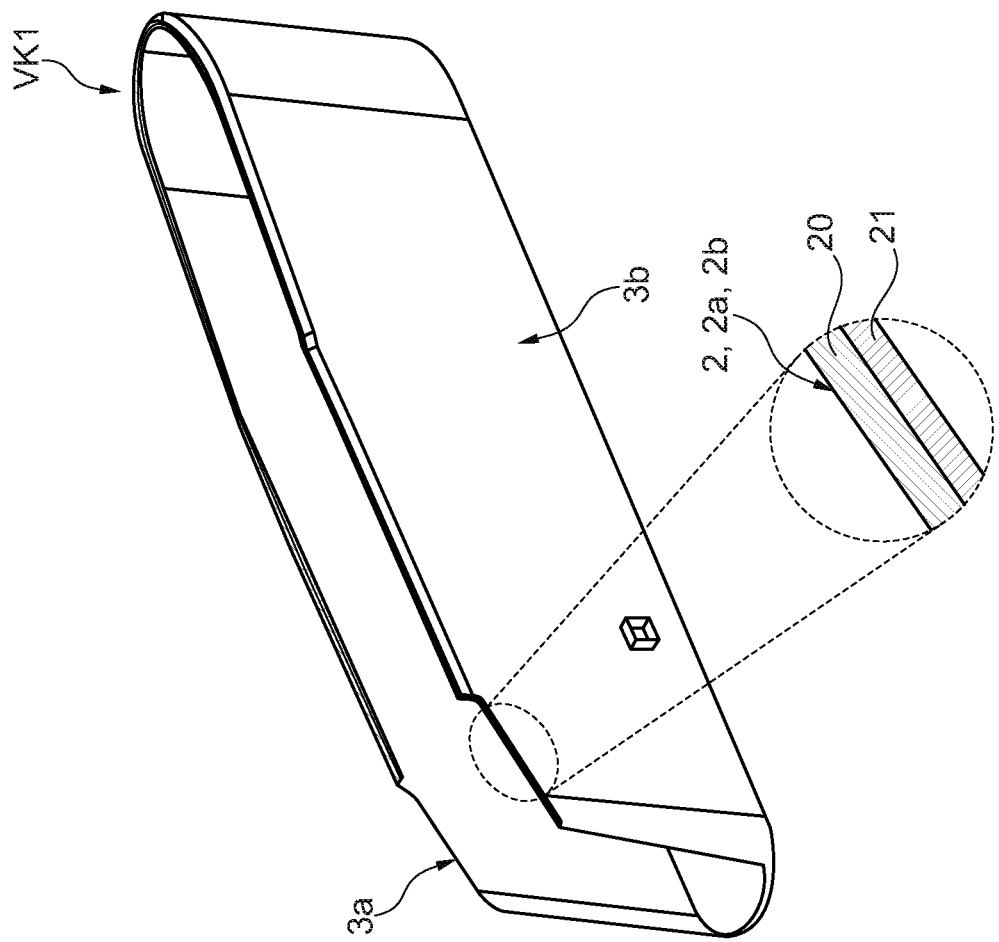
FIG. 3 shows an engine component in the form of a cladding in perspective individual view.
Figure 4:
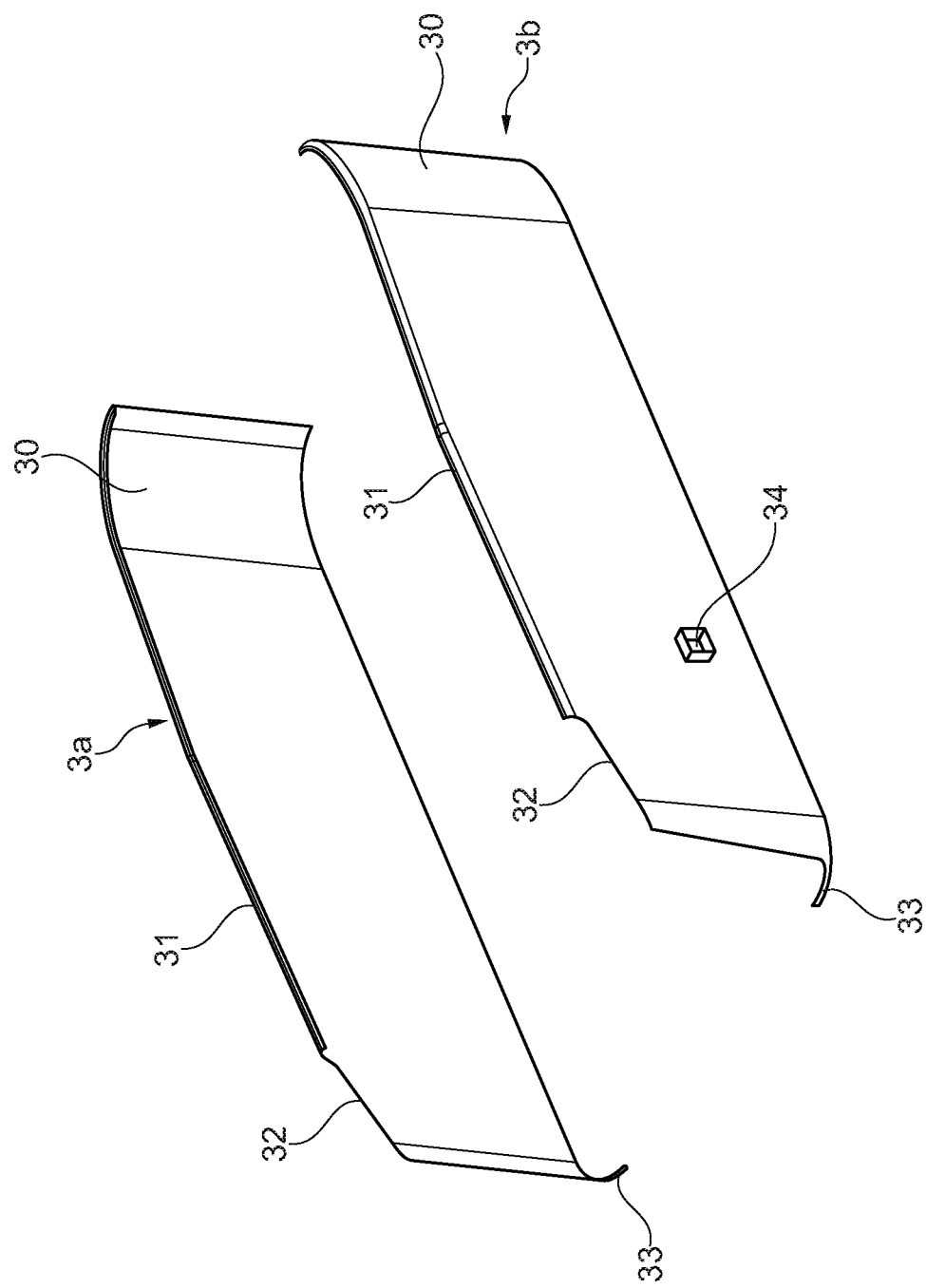

FIG. 3 shows, in perspective view and individual depiction, the cladding VK1. In the present case, it consists of two elongated sheet-metal-like side parts 3a and 3b. These side parts 3a and 3b, that are shown individually in FIG. 4, are fixated to each other at a front and rear end for example to form the cladding VK1, for instance they are welded together. At the finished cladding VK1, each of the side parts 3a and 3b forms a side wall that delimits the interior space of the cladding VK1 inside of which electronic components and/or conduits conducting fluids are accommodated in a protecting manner, for example.

In the finished cladding VK1, each of the side parts 3a, 3b has a comparatively complex three-dimensional structure with reshaped, free-punched, and/or protruding structure sections 30 to 34. For example, each side part 3a or 3b is provided with a curved end section 30, a bent edge section 31, a free-punched edge section 32, a web-like projecting connection section 33, and a connector section 34 with a passage opening. The previously mentioned sections 30 to 34 thus form structure sections of the respective side part 3a, 3b through which the respective side part 3a or 3b is provided with a complex three-dimensional contour. Retrospectively attaching a layer made of intumescent material or individual pieces made of intumescent material at the same is thus comparatively laborious and associated with high mounting effort.

Figure 5:
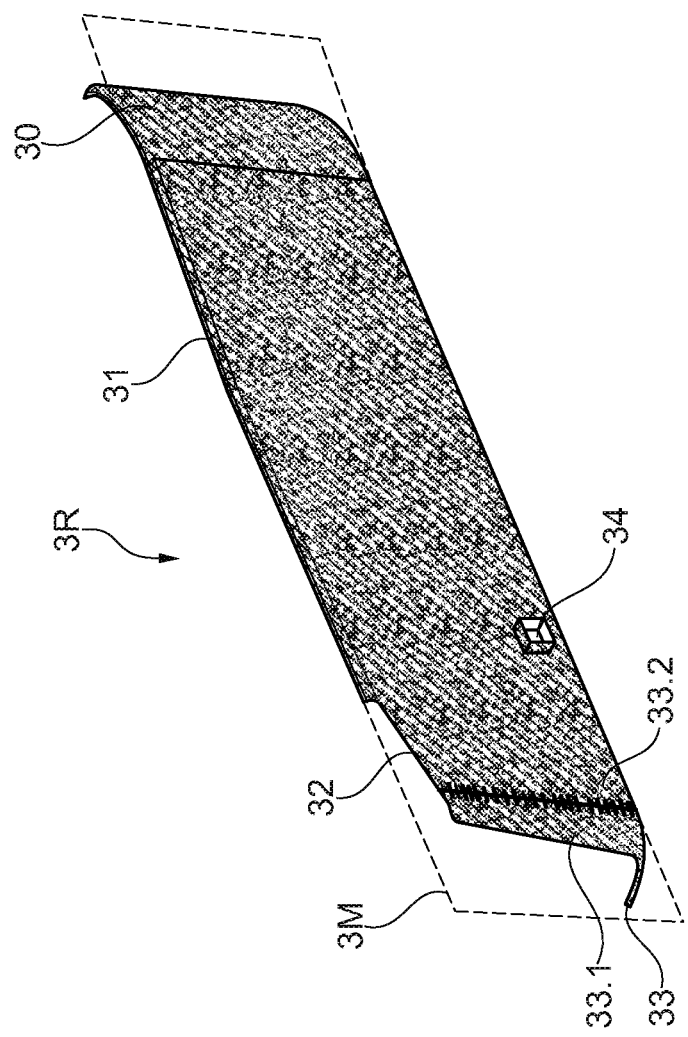
FIG. 5 shows a blank of an intumescent material for manufacturing one of the side parts of FIG. 4, obtained from a batt of intumescent material.

Now it is for example suggested in one embodiment variant to prefabricate in advance a blank 3R from intumescent material corresponding to FIG. 5, in which the contours of the side part 3b to be manufactured are already reproduced and which is connected to a support material, for example a fiber-reinforced composite laminate, to provide the required stiffness. Prior to or after the connection to the support material, which in that case is also already adjusted to the contours of the side part 3b to be manufactured, the blank is impregnated by means of a curing resin. The blank 3R and the support material can also be connected to each other in a firmly bonded and/or form-fit manner to form a composite component by means of the resin, which is for example provided between a material layer formed by the blank 3R and the support material or is introduced in a RTM, VARI or VARTM method, or through the respective resin mass.

The prefabricated blank 3R of FIG. 5 is manufactured from a piece of batt 3M that in the present case is substantially rectangular. In this batt 3M, which is indicated by a dashed line in FIG. 5, the sections 30 to 34 of the side part 3b to be manufactured are reproduced. For this purpose, areas are for example cut away and thus removed, areas are bent and/or sawn together or woven together. For instance, in the area of the structure sections 33 and 32, a connection location 33.2 in the shape of a continuous seam is provided in order to lock an angled segment 33.1 of the batt 3M, by means of which the structure section 33 is later formed at the side part 3b, in the changed spatial position.

In the following alternative embodiment variant that is illustrated based on FIGS. 6A, 6B and 6C, the manufacture of blank 3R, 3L from intumescent material for the two side parts 3a and 3b is not carried out by using a prefabricated semi-finished product, such as for example the batt 3M. Rather, in this case the respective blank 3R, 3L with the desired contour is obtained directly by means of a molding tool 4 and a dispersion 50.

Here, a molding tool 4 that is shown by way of example in FIG. 6A imitates the shape of the side part to be manufactured—here the side part 3b—in a correspondingly precise manner. Consequently, the molding tool 4 also has structuring sections 40 to 44 which correspond to the individual structure sections 30 to 34 of the side part 3b. The molding tool 4 is water-permeable and for this purpose is configured with a grid or screen structure 400. Here, a molding tool with a screen structure is illustrated by way of example based on FIG. 6A. For this purpose, the planar material of the molding tool is provided throughout with perforations through which water can be drained.

Figure 6B:
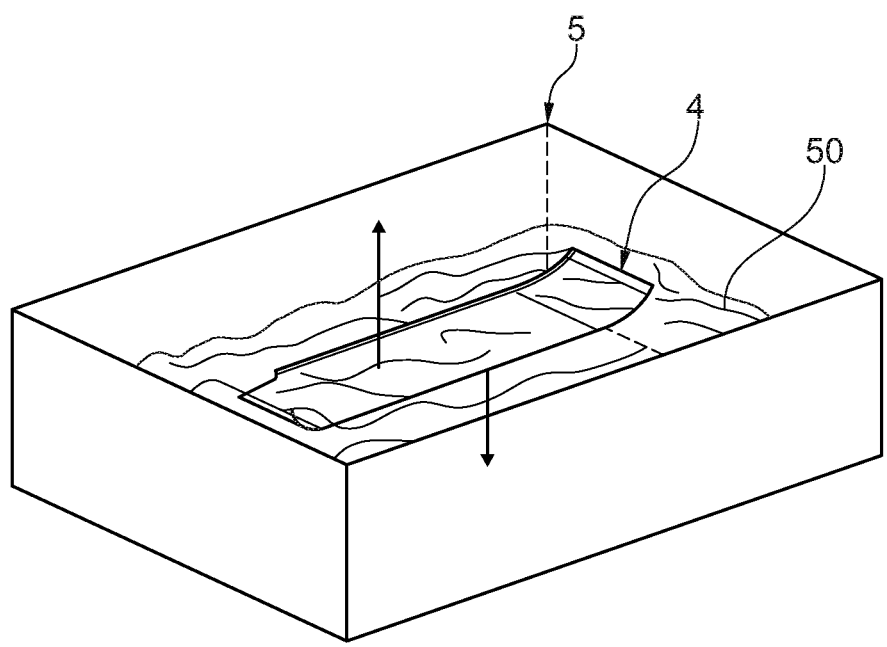
FIG. 6B shows an illustration of the immersion of the molding tool of FIG. 6A into an aqueous suspension containing, among other things, organic and/or inorganic fibers, an intumescent substance, as well as a binding agent for the blank to be manufactured.

For manufacturing the blank 3R, the water-permeable molding tool 4 is immersed in a dispersion 50 stored in a container 5, corresponding to FIG. 6B. Here, the dispersion 50 is an aqueous suspension that for example contains an intumescent substance as well as a binding agent in addition to the organic and/or inorganic [fibers]. Possible compositions of the dispersion 50 can be found in EP 0 949 313 B1, for example. In the dispersion, organic fibers from polyester, nylon, aramid, acrylic resin, olefin or cellulose and/or inorganic fibers from glass, mineral wool, stone wool, slag wool, asbestos, ceramic, [zirconium dioxide], aluminum oxide or other glassy synthetic fibers are dispersed, for example. Examples of the contained binding agent can be an acrylic, butadiene, vinyl or silicone polymer as well as an intumescent substance, for example foamable graphite, vermiculite or perlite.

Component parts of the intumescent material attach to the molding tool 4 immersed in the dispersion 50, wherein excess liquid can be drained through the screen structure 400 of the molding tool 4 when the molding tool 4 is taken out of the container 5. Thus, the blank 3R from intumescent material can be taken out of the molding tool 4 following a drying phase, with the blank 3R being already adjusted with respect to its contours to the contours of the side part 3b to be manufactured, so that it can be attached directly at the support material for the side part 3b or can be connected to the same to form a composite component An impregnation with resin is provided for stabilizing and sealing the intumescent material of the blank 3R or the analogously manufactured blank 3L that is also shown in FIG. 6C. At that, the blank 3R, 3L, which usually has a wall thickness of no more than 4.2 mm, can be impregnated with resin in an autoclave, for example. For obtaining a smaller layer thickness at the finished side part 3b or 3a, the material of the respective blank 3R or 3L can also be compressed prior to the impregnation with resin. In that case, the resin keeps the compressed intumescent material in its compressed shape and seals it against the entry of any liquids. Here, with a suitable compression, the thickness of a layer formed from the blank 3R or 3L of intumescent material can lie in the range of 0.4 mm to 1.5 mm, in any case below 2.3 mm, in particular below 2 mm.

Figure 7:
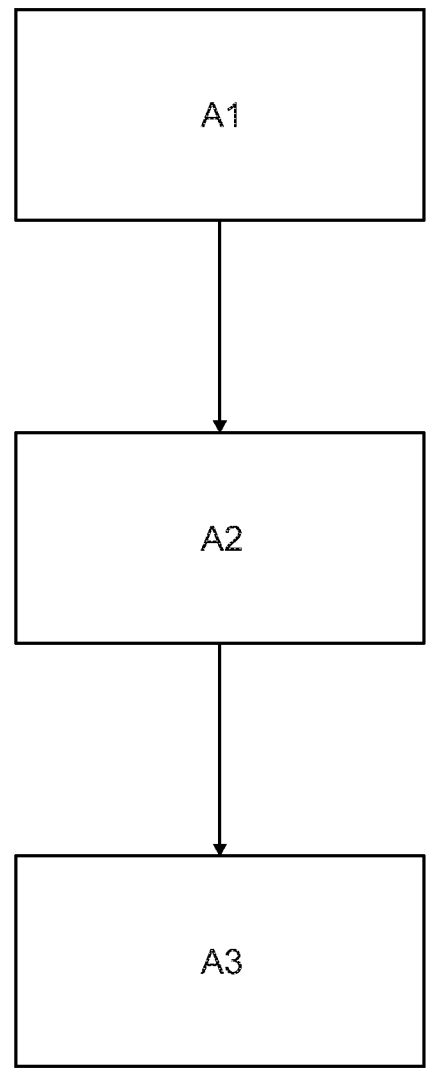
FIG. 7 shows a flow chart of an embodiment variant of a manufacturing method according to the invention.

The basic progression of the embodiment variants for manufacturing and using a blank as shown in FIGS. 5 and 6A to 6C is clarified once more based on the flow chart of FIG. 7.

In a first method step, the 3D blank 3L, 3R is made from the intumescent material, either by means of cutting, bending and/or sawing the flexible batt(s) 3M made of intumescent material, or by immersing the molding tool 4 into the aqueous suspension that contains the component parts of the intumescent material. In a following method step A2, the respective blank 3R, 3L is combined with a support material in order to create a composite component with the same that contains a layer with intumescent material. A compression of the intumescent material can be optionally provided here for the purpose of densifying it and obtaining a decreased layer thickness. Subsequently, in a next method step A3, an impregnation of the material layers stacked on top of each other and formed by the support material as well as the respective blank 3L, 3R is performed.

As is in particular illustrated based on FIGS. 3 to 5 and 6C, in the present case the blank 3R or 3L prefabricated from the intumescent material already forms interfaces for connecting to the other side part 3a or 3b and for assembling the cladding VK1 by means of the structure sections 30 to 33. Also, the edge of a passage opening for passing further components into the interior of the cladding VK1 is already formed at the blank 3R, 3L (at a left end of the cladding VK1 with respect to the previously mentioned Figures). Further, at least one connection opening or connection interface for the mechanical and/or electrical connection of a further engine component at a connector section 34 is also already formed in the respective blank 3R, 3L before the combination with the support material and the impregnation with the resin is carried out.

Through the use of an intumescent material, at least one layer is provided in a composite component of a part of an engine component—such as the side parts 3a and 3b in which preferably multiple composite materials are integrated—that increases by a multiple of its original volume if a temperature exceeds a threshold value (e.g. of 195° C.), and in particular in the event that a fire occurs inside the engine T, and in this manner provides an insulating layer in the kind of a heat shield, and/or closes areas off in a targeted manner due to its increase in volume, so that a flame cannot easily spread into these areas.

As has been previously explained, in order to form a layer provided by the blank 3R, 3L in a particularly thin manner, in one variant it is provided in this context to impregnate the composite component formed by the blank 3R, 3L with resin in a compressed shape, keeping it in its compressed shape and sealing it with the resin. In the following, possible further process steps are illustrated, in which a material layer 21' is shown in a manner that is representative for any kind of 3D blank 3L, 3R made of intumescent material that has contours which are already adjusted to the contours of the part of the engine component that is to be manufactured therewith. A possible support material is represented by the material layers 20', 20a', 20b', 23'.

Figure 8A:
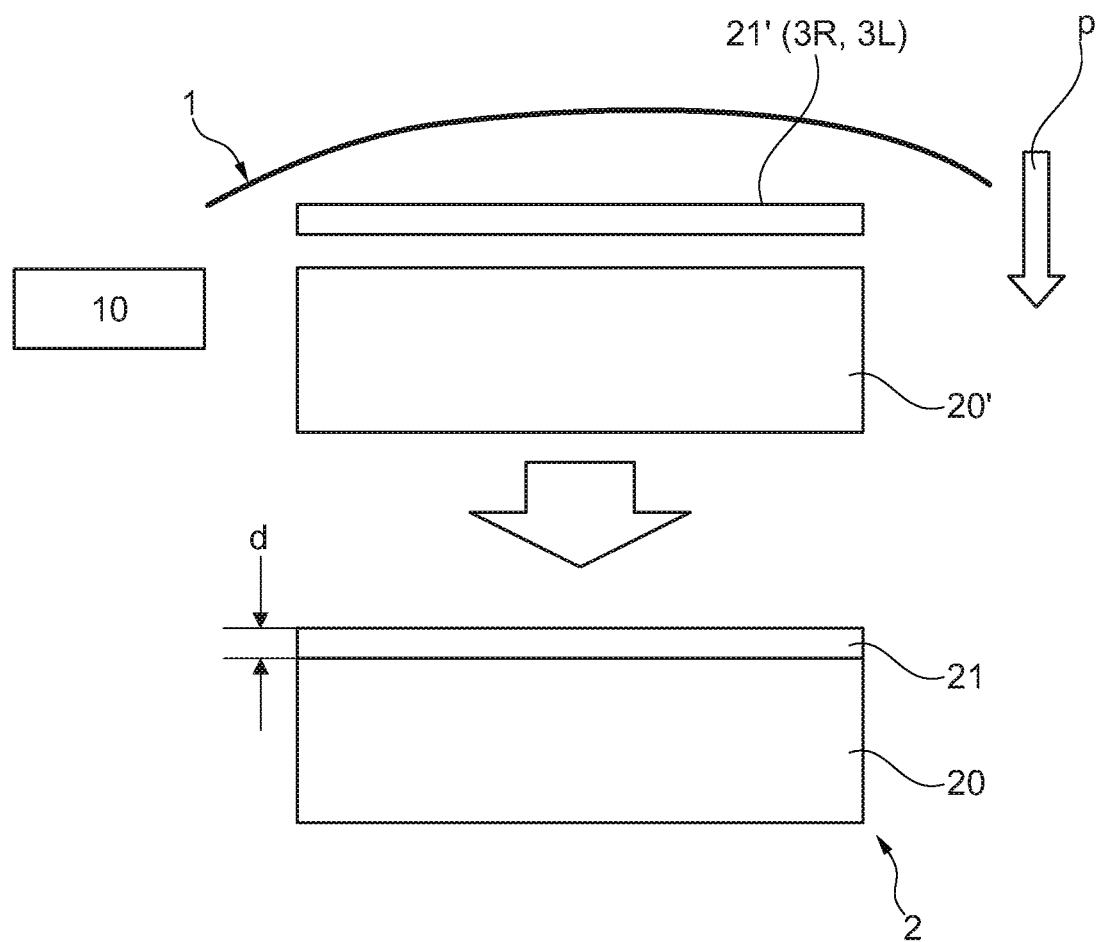
FIGS. 8A-8C show, in a schematic manner, different embodiment variants for further process steps in variants of a manufacturing method according to the invention, also illustrating different material layers for manufacturing a multi-layer composite component from the blank and at least one support material.

In a variant for further process steps as illustrated based on FIG. 8A, it is provided that a material layer 21' made of intumescent material is placed inside a tool 1 onto a composite material layer 20', for example with a fiber reinforcement. Subsequently, an increased pressure p is applied by means of the tool 1 so as to compress the material layers 20' and 21' that are stacked on top of each other. At that, in particular the material layer from intumescent material 21' is compressed.

Subsequently, a resin is introduced via a resin supply 10 of the tool 1 for impregnating the compressed material layers 20' and 21'. In particular the preferably highly porous intumescent material of the material layer 21' is filled with the resin, so that not only the two material layers 20' and 21' are connected to each other via the resin in a firmly bonded manner, but also the material layer 21' of the intumescent material is held in its compressed shape and sealed. The cured resin thus conserves the compressed shape of the intumescent material and in particular seals it towards the outside against the entry of any liquids. The introduction of the resin via the resin supply 10 is for example realized in the kind of a resin injection method (RTM methods) or in a vacuum-aided manner in a VARI or VARTM method.

For instance, Tecnofire® by Technical Fibre Products Ltd. is suitable for providing a material layer 21' of an intumescent highly porous material. But generally, also other intumescent materials are suitable, in particular such materials that are present in a felt-like manner in the form of a flexible fiber fleece material, or which can be obtained in such a form from a dispersion 50.

In a manufacturing method performed corresponding to the variant of FIG. 8A, what is obtained in the end is a composite component 2 in which multiple layers 20 and 21 are present in an interconnected manner. Here, a composite material layer 20, which is usually also referred to as a composite laminate, is provided for providing the desired structural characteristics, such as stiffness and strength. The at least one additional layer 21 with the compressed intumescent material serves for fire prevention. This layer 21 is comparatively thin-walled and has only a (layer) thickness of less than 2 mm, for example a thickness in the range of 0.4 mm to 1.5 mm.

If a temperature exceeds a threshold value, for example of approximately 195° C., in the area of the layer 21 that is provided with the intumescent material, or if flames occur in this area, the cured resin of the composite component 2 degasses. In that case, the intumescent material of layer 21 is no longer retained in its compressed shape by the resin and can (additionally) swell or foam under the effect of the temperature. The associated increase in volume of layer 21 that is provided with the intumescent material can serve as a fire-retardant or fireproof barrier in the kind of a heat shield. Alternatively or additionally, an area of the engine T can be sealed off through the increase in volume, depending on which engine component is manufactured from the composite component 2.

Figure 8B:
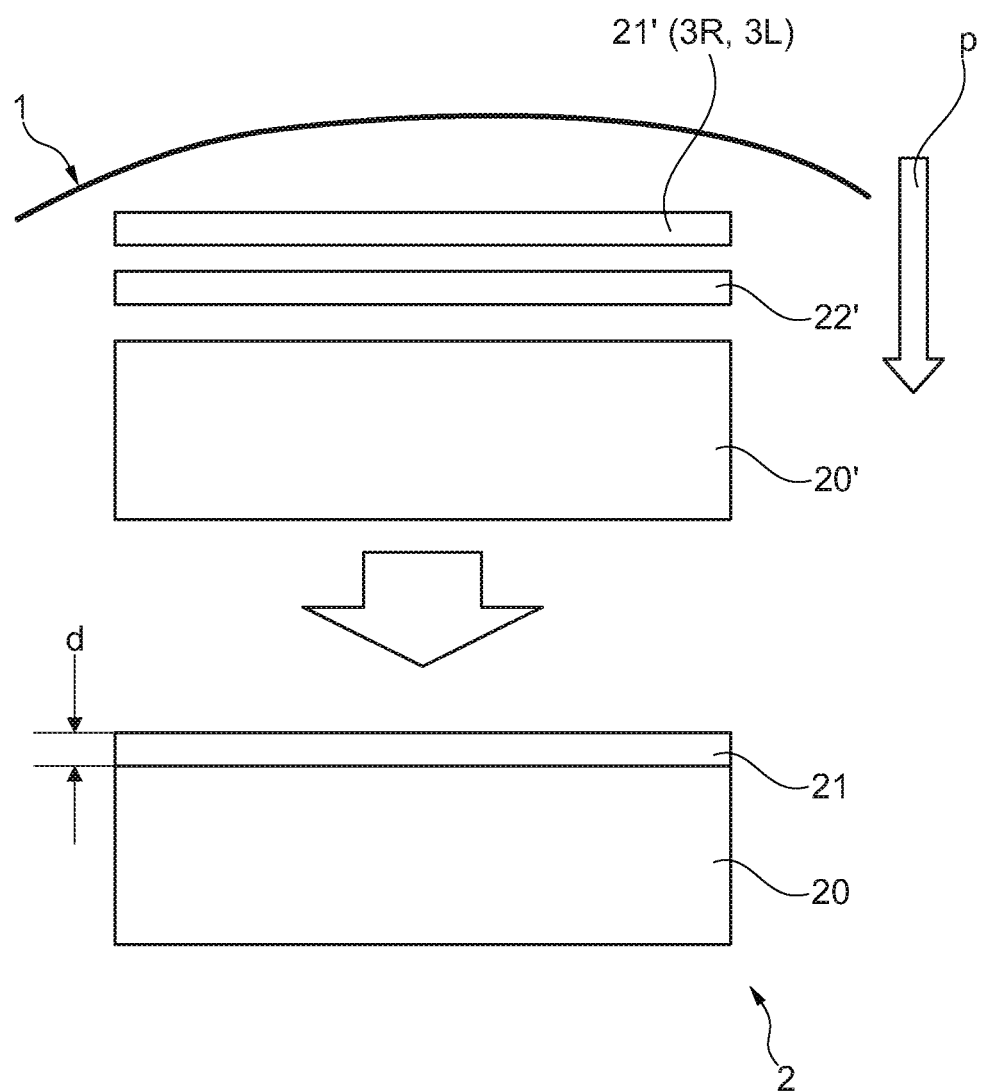

In the variant of FIG. 8B, a separate bonding agent layer 22' is used for impregnating and sealing the compressed material layer 21' from intumescent porous material. This bonding agent layer 22' is provided during manufacturing of the composite component 2 between the material layer 21' of the intumescent material and the composite material layer 20'. Through the pressure p applied by means of the tool 1 and corresponding heating, the resin of the bonding agent layer 22' enters the compressed material layer 21' of the intumescent material, and at the same time ensures a firmly bonded connection between this material layer 21' and the composite material layer 20'. Thus, here the composite component 2 is manufactured by means of the bonding agent layer 22' by way of a so-called wet-on-wet bonding or co-curing or co-bonding with the different material layers 20' and 21'. By applying the pressure p—for example of approximately 7 bar—already at an early stage, a compression of the intumescent material is obtained early on, whereby the amount of resin for impregnating the latter can be kept comparatively low.

Figure 8C:
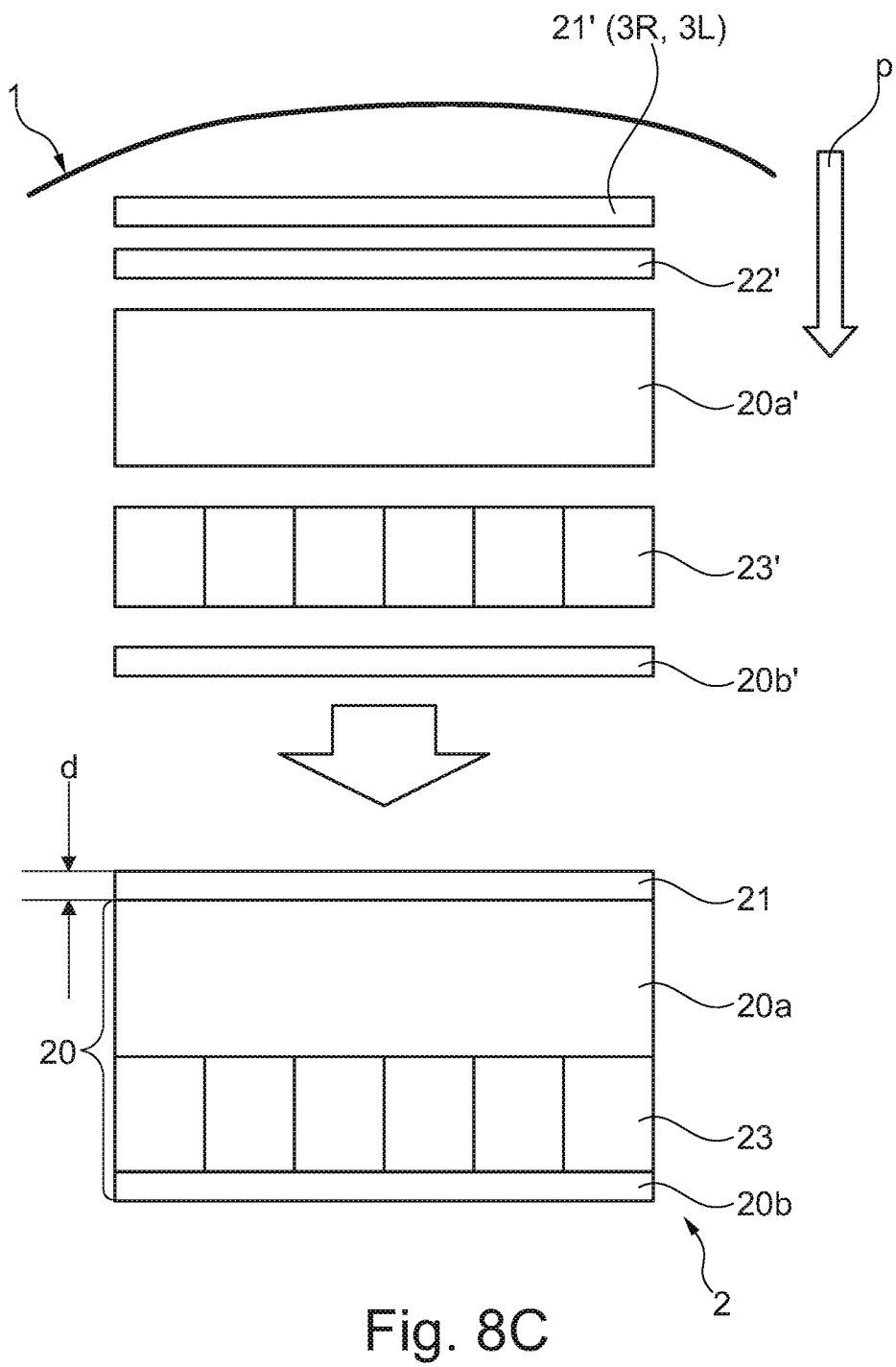

In the variant of FIG. 8C, a honeycomb layer 23' is provided in addition to the bonding agent layer 22'. This honeycomb layer 23' serves for creating a honeycomb structure layer 23 with multiple honeycombs that are located next to each other in the composite component 2 to be manufactured. Through such a honeycomb structure layer 23, e.g. an improved noise reduction can be achieved, whereby a correspondingly manufactured composite component is particularly suitable for manufacturing an inner surface of an engine housing N. Here, the honeycomb layer 23' is provided between two separate composite material layers 20a' and 20b', with the bonding agent layer 22' being provided between the one separate composite material layer 20a' and the material layer 21' made of intumescent material.

In all three previously explained variants of FIGS. 8A, 8B and 8C, a composite component 2 is provided through the further process steps, resulting in an outer layer 21 with intumescent material being present in a compressed and sealed shape due to the cured resin. In addition, the comparatively thin layer 21 with intumescent material is comparatively rigid due to the cured resin, while the originally used material layer 21' of the blank 3L, 3R is still flexible and is for example provided in the form of a fiber fleece material.

Incidentally, it is remarkable that when using a pre-impregnated composite material layer 20' or 20a', 20b', it can be achieved by means of an early application of the pressure p that the resin provided for the impregnation of the compressed intumescent material does either not intermix or barely intermixes with a resin that is used for the pre-impregnation of the respective composite material layer 20' or 20a', 20b'.

Figure 9:
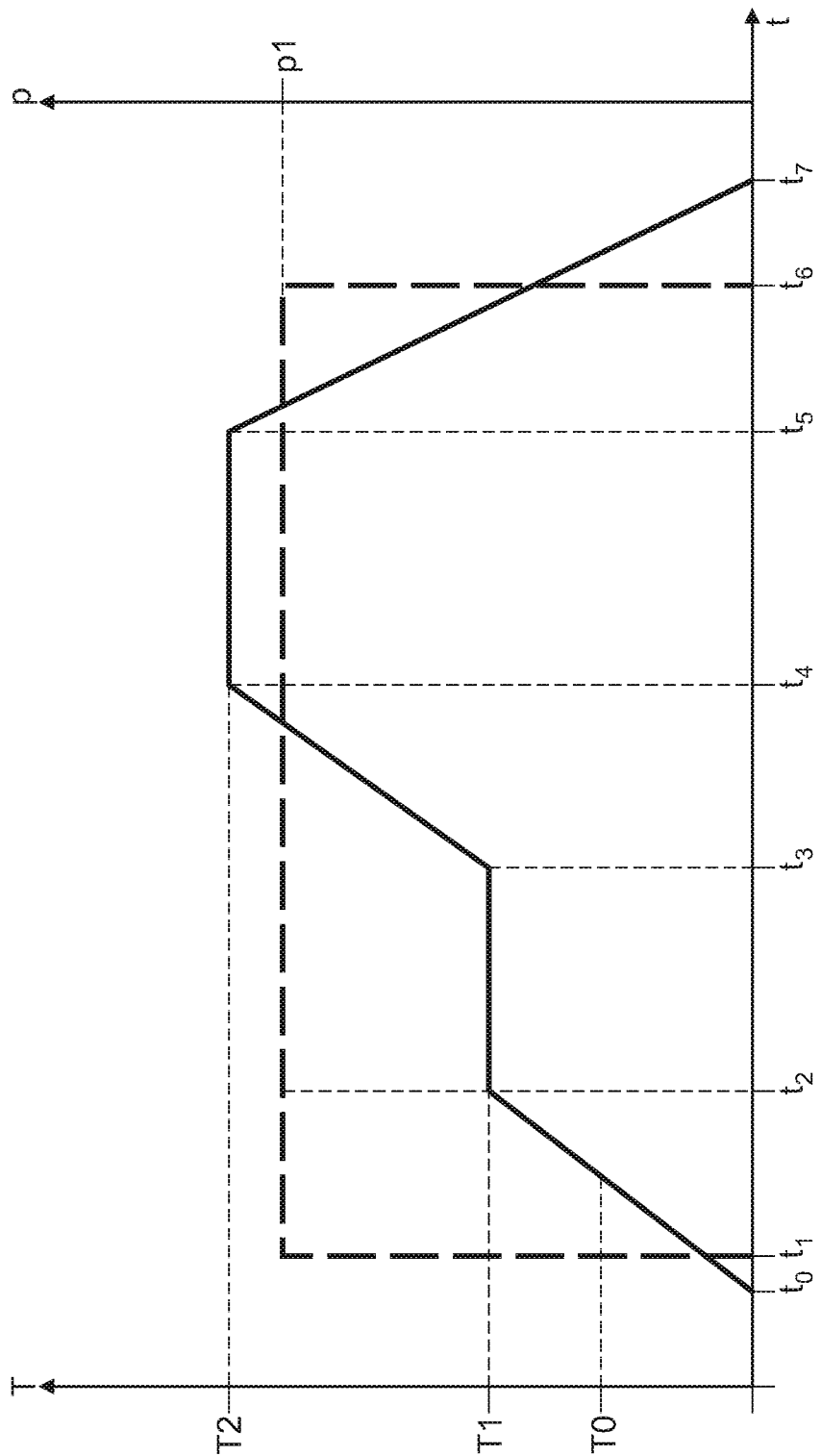
FIG. 9 shows a diagram in which a temperature development and a pressure development for a variant of a manufacturing method according to the invention that is performed with an autoclave are indicated over time.

By way of example, the diagram of FIG. 9 illustrates temperature and pressure developments for a further process step of a manufacturing process by means of which a composite component 2 is obtained from material layers that are stacked on top of each other. In the diagram of FIG. 9, a temperature T as well as a pressure p is applied over time t. Here, FIG. 9 illustrates an autoclave process for manufacturing a composite component 2, for example.

Already at the beginning of the manufacturing processes that is illustrated based on FIG. 9, a heating appliance is started up at a point in time $t_0$, and thus the temperature inside the autoclave that serves as a tool 1 is progressively increased. For compressing the material layers that are stacked on top of each other and in particular the material layer 21' made of intumescent porous material, a (compression) pressure p1 above an ambient pressure is created as the heating appliance is activated. Here, the pressure p1 is already applied at a point in time $t_1$, before the temperature exceeds a minimum threshold value T0 at which the resin, which is either liquefied or kept liquid, begins filling the pores of the compressed intumescent material.

The pressure p1 applied to the material layers that are stacked on top of each other is maintained over a greater part of the manufacturing cycle within a time period $t_1$ to $t_6$, in which the temperature is at first increased up to a first maximum temperature T1>T0, with T1≈120° C. Here, the corresponding temperature level is maintained for a time period $t_2$ to $t_3$, before in a next step the temperature is increased (point in time $t_4$>$t_3$) once more to a higher maximum temperature T2, with T2≈175° C., and this increased temperature level is maintained up to a point in time $t_5$. After that, a slow cooling process until a point in time $t_7$ is allowed, wherein the pressure p is also lowered again to ambient pressure in the interim period. Thus, in the variant of FIG. 9, the (compression) pressure p1 is applied over the entire time period $t_0$ to $t_5$ in which the temperature T is increased stepwise up to the second maximum temperature T2, and thus in particular before the temperature has exceeded a minimum temperature of ≈70° C. A defined dwell time ($t_3$–$t_2$) for the first maximum temperature of T1≈120° C. serves for providing tension equalization during the curing process, since it is to be ensured that the tool and the composite component have a sufficient temperature before the actual curing is performed by means of the increase up to a second maximum temperature T2≈175° C.

Figure 10:
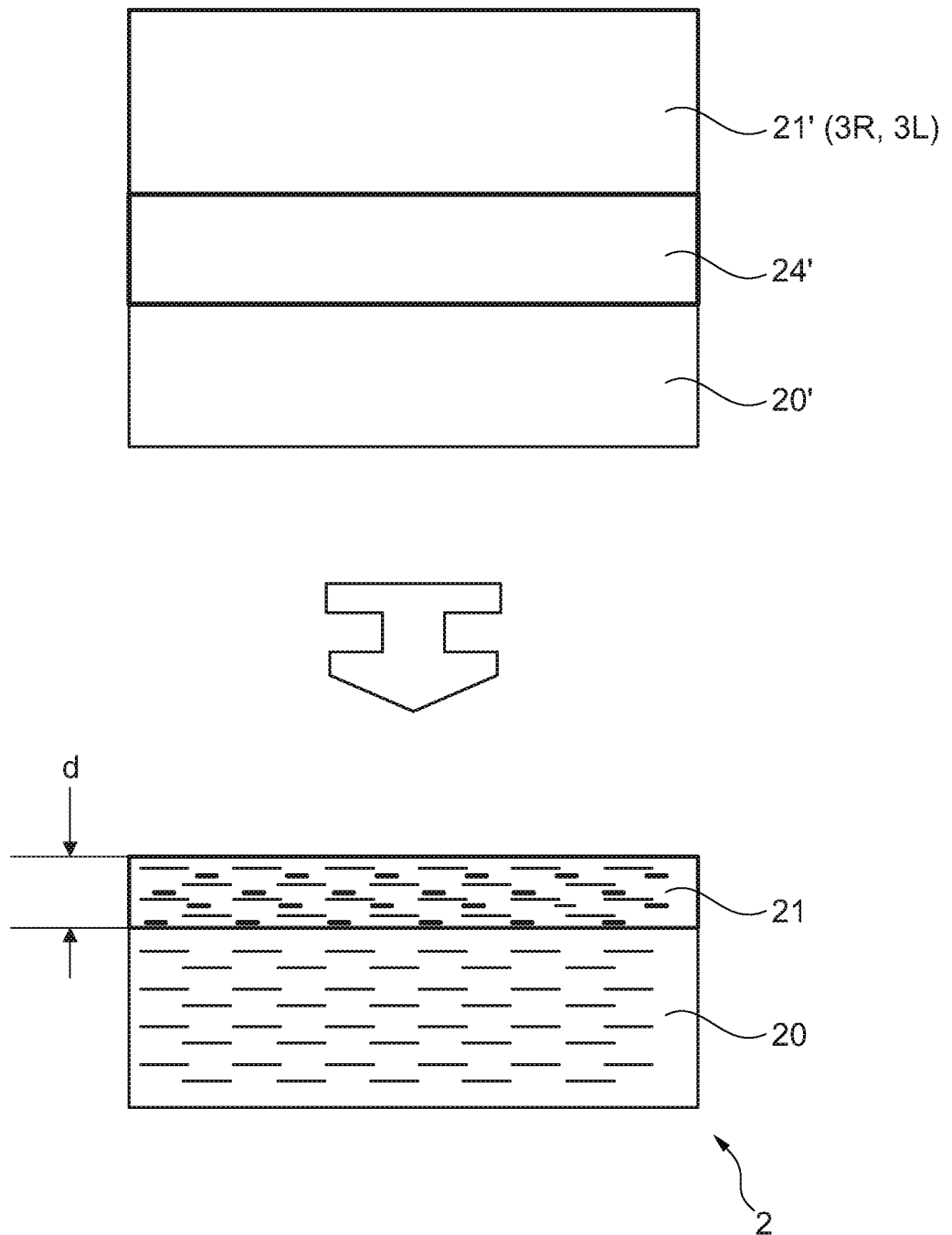
FIG. 10 shows, in a schematic manner, a further embodiment variant for further process steps of a variant of a manufacturing method according to the invention, in which a separate resin layer between a material layer of the blank made of intumescent material and a material layer of a composite material are used as the support material for creating a composite component and a part of an engine component.

FIG. 10 once more illustrates, in a schematic manner, a variant for manufacturing a composite component 2 based on the temperature and pressure developments of FIG. 9. At that, a resin layer 24' (analogously to the bonding agent layer 22') is for example inserted in the kind of a thin film between a felt-like material layer 21' made of an intumescent porous material, such as e.g. Tecnofire® that is provided through a prefabricated blank 3R, 3L, and a composite material layer 20'. As a result of the early compression, especially the material layer 21' made of intumescent material is densified, and the resin of the resin layer 24' enters it as the temperature is subsequently increased in a stepwise manner. At that, any intermixing of the resin of the resin layer 24' with a resin from a possibly pre-impregnated prepreg of the composite material layer 20' is excluded, or it is extremely minor, occurring only at the edge of the material layers 20' and 21'. Thus, at an outer shell surface, the composite component 2 for the engine component manufactured in this manner has only a thin layer 21 with intumescent material as well as resin sealing and stabilizing the same, having a thickness d≤2 mm. At that, the cured resin is homogenously distributed within the layer 21 with intumescent material, and is present in the composite material layer 20 only at an edge that adjoins the layer 21 with the intumescent material.

In the previously explained embodiment variants of FIGS. 8A to 10, the material layer 21' of the blank 3R, 3L from intumescent material is densified to approximately ⅓ or ¼ of its original thickness, for example through the applied pressure p1, before the stabilizing resin is introduced. Here, the early compression of the material layer 21 from intumescent material has proven to be particularly advantageous if different resins with different viscosities in the different material layers 20', 20a', 20b', 22', 23' and 24' are used. What is particularly achieved through the early compression is that the different resins barely intermix or do not intermix at all, and especially that the resin provided for sealing and stabilizing the compressed intumescent material is significantly present in the manufactured composite component 2 only in the layer 21 with the intumescent material.

PARTS LIST 1 tool/autoclave
10 resin supply
11 low-pressure compressor
12 high-pressure compressor
13 high-pressure turbine
14 medium-pressure turbine
15 low-pressure turbine
2, 2a, 2b composite component
20 composite material layer/composite laminate (support material)
20' composite material layer/prepreg (support material)
20a, 20b separate composite material layer (support material)
20a', 20b' separate composite material layer (support material)
21 layer with intumescent material
21' material layer from intumescent material
22' bonding agent layer
23 honeycomb structure layer
23' honeycomb layer
24' resin layer
30-33 structure section
33.1 segment
33.2 connection location
3a, 3b side part
3M batt
3R, 3L blank
4 molding tool
40-43 structuring section
400 grid/screen structure
5 container
50 dispersion
A outlet
B bypass channel
BK combustion chamber section
C outlet cone
d thickness
E inlet/intake
F fan
FC fan housing
HK trailing edge
M central axis/rotational axis
N engine housing
p (compression) pressure R entry direction
RS rotor shaft
T turbofan engine
TT turbine
U circumferential direction
compressor
VK1, VK2 cladding

The invention claimed is:

1. A method for manufacturing a part of an engine component, comprising:
providing a blank made from a batt of an intumescent material that contains at least one fibrous matrix that includes an intumescent substance and at least one chosen from organic fibers and inorganic fibers;
forming the blank from the intumescent material with a three-dimensional structure having contours adjusted with respect to contours of the part of the engine component;
impregnating the blank that comprises the three-dimensional structure with a curing resin and curing the resin to maintain the three-dimensional structure and to seal the intumescent material; and
prior to or after the impregnation, connecting the blank to a support material having contours also adjusted to the contours of the part of the engine component, the support material and blank connected thereto at least partially forming the engine component.

2. The method according to claim 1, and further comprising performing at least one chosen from reshaping, separating and removing sections of the batt for creating the three-dimensional structure.

3. The method according to claim 1, wherein sections of the batt are at least one chosen from sawn and woven together with at least one chosen from each other and with sections of a further intumescent material for creating the three-dimensional structure.

4. The method according to claim 1, and further comprising manufacturing the blank with a molding tool which is adjusted to have contours corresponding to contours of the part of the engine component to be manufactured, and to which fibers for the fibrous matrix dispersed inside a dispersion attach.

5. The method according to claim 4, and further comprising providing that the molding tool has a water-permeable grid structure or screen structure.

6. The method according to claim 4, and further comprising immersing the molding tool in the dispersion.

7. The method according to claim 4, and further comprising providing that the dispersion is an aqueous suspension that contains, the intumescent substance, a binding agent and the at least one chosen from the organic fibers and the inorganic fibers.

8. The method according to claim 1, and further comprising:
stacking the blank and the support material on top of each other prior to the impregnation, and applying a pressure to compress at least the intumescent material of the blank, and
holding the intumescent material in a compressed shape and sealing off the intumescent material against entry of liquid through the curing resin.

9. The method according to claim 8, and further comprising heating the blank and the support material up to at least a minimum temperature for the impregnation with the resin.

10. The method according to claim 9, and further comprising applying the pressure to compress at least the intumescent material before the minimum temperature is reached.

11. The method according to claim 8, and further comprising using an autoclave to apply the pressure to compress at least the intumescent material.

12. The method according to claim 1, and further comprising providing that the blank from the intumescent material has a wall thickness of less than 4.2 mm.

13. The method according to claim 1, and further comprising providing that a wall thickness of a layer formed from the intumescent material does not exceed 2.3 mm in the manufactured engine component.

14. The method according to claim 13, and further comprising providing that the wall thickness is in a range of 0.4 mm to 1.5 mm.

* * * * *